(12) United States Patent
Yao et al.

(10) Patent No.: US 8,570,720 B2
(45) Date of Patent: Oct. 29, 2013

(54) CFAST DUPLICATION SYSTEM

(76) Inventors: Jeffrey Yao, Industry, CA (US); Anthony Xinghua Zhang, Industry, CA (US)

( * ) Notice: Subject to any disclaimer, the term of this patent is extended or adjusted under 35 U.S.C. 154(b) by 282 days.

(21) Appl. No.: 13/099,937

(22) Filed: May 3, 2011

(65) Prior Publication Data
US 2012/0281355 A1  Nov. 8, 2012

(51) Int. Cl.
*G06F 1/16* (2006.01)
*H05K 5/00* (2006.01)
*H05K 7/00* (2006.01)

(52) U.S. Cl.
USPC .................................................. 361/679.02

(58) Field of Classification Search
None
See application file for complete search history.

(56) References Cited

U.S. PATENT DOCUMENTS

| | | | | |
|---|---|---|---|---|
| 5,486,982 A * | 1/1996 | Hsu | | 361/728 |
| 5,640,535 A * | 6/1997 | Suzuki et al. | | 711/170 |
| 5,796,684 A * | 8/1998 | Yaegashi | | 709/230 |
| 6,222,726 B1 * | 4/2001 | Cha | | 361/679.32 |
| 6,556,450 B1 * | 4/2003 | Rasmussen et al. | | 361/754 |
| 6,563,714 B2 * | 5/2003 | Chang | | 361/752 |
| 6,636,918 B1 * | 10/2003 | Aguilar et al. | | 710/303 |
| 6,741,463 B1 * | 5/2004 | Akhtar et al. | | 361/679.41 |
| 6,896,620 B1 * | 5/2005 | Luciano et al. | | 463/46 |
| 6,980,427 B2 * | 12/2005 | Garnett et al. | | 361/679.38 |
| 7,008,240 B1 * | 3/2006 | Wang et al. | | 439/76.1 |
| 7,108,606 B1 * | 9/2006 | Luciano et al. | | 463/46 |
| 7,391,607 B2 * | 6/2008 | Minami | | 361/679.33 |
| 7,601,298 B2 * | 10/2009 | Waldo et al. | | 422/22 |
| 7,650,612 B2 * | 1/2010 | Liu et al. | | 720/615 |
| 7,818,442 B2 * | 10/2010 | Hershey et al. | | 709/231 |
| 7,826,924 B2 * | 11/2010 | Lou et al. | | 700/245 |
| 7,875,870 B2 * | 1/2011 | Maruyama | | 250/559.4 |
| 2007/0055787 A1 * | 3/2007 | Hershey et al. | | 709/231 |
| 2007/0283069 A1 * | 12/2007 | Jones et al. | | 710/301 |
| 2008/0005393 A1 * | 1/2008 | Wang et al. | | 710/33 |
| 2008/0259555 A1 * | 10/2008 | Bechtolsheim et al. | | 361/686 |
| 2010/0017556 A1 * | 1/2010 | Chin et al. | | 711/103 |
| 2012/0281347 A1 * | 11/2012 | Lee et al. | | 361/679.31 |

\* cited by examiner

*Primary Examiner* — Jinhee J. Lee
*Assistant Examiner* — Xanthia C Cunningham
(74) *Attorney, Agent, or Firm* — Clement Cheng

(57) ABSTRACT

The CFAST duplication system allows digital data copy from a master CFAST storage device to multiple target CFAST storage devices. The CFAST duplication system includes a duplicator chassis with the space that can install multiple 5.25 inch optical disc drives. A controller is secured in a tray-shaped frame with overall dimensions of one 5.25 inch optical disc drive. An electronic circuit is mechanically secured within the controller, and includes a digital logic circuit for reading digital data from one CFAST storage device and writing the read digital data to other CFAST storage devices. CFAST decks are the means by which CFAST storage devices can be plugged into the CFAST duplicator system.

17 Claims, 5 Drawing Sheets

CFAST DUPLICATION SYSTEM

FIELD OF THE INVENTION

The present invention is in the field of digital duplication systems.

DISCUSSION OF RELATED ART

Flash memory has a variety of different forms. The CFAST standard is a variant of the Compact Flash (CF) card. The CF card is based on PATA/IDE, while CFAST storage is based on SATA. A CFAST storage device supports a higher maximum transfer rate than presently available CF cards while maintaining the small original CF form factor. CFAST storage device breaks the speed bottleneck between the SSD and the device by using a SATA interface and its transfer rates up to 375 MB/s while PATA is limited to 133 MB/s.

CFAST storage devices are used in digital cameras, industry computers and many other digital devices. CFAST stores voluminous amounts of information at an affordable cost. Consequently, the amount of data capable of being stored on such devices, in variant forms of computer program, photo graphics, audio and video files, increases continuously. Frequently, purchasers of new industry computers receive a significant number of computer programs pre-recorded on CFAST storage device included in the computers. Pre-loading software programs onto a CFAST storage device, from distribution media like CD or DVD, is time consuming. Therefore, prior to deliver such industry computers, assembling such computer systems employ various techniques to either automate, as much as possible, software installation, or they merely copy software recorded on a CFAST storage device installed in one computer onto a CFAST storage device installed in the new computer. Either of these techniques for duplicating digital data present on a CFAST storage device is relatively inefficient and cumbersome. Consequently, an apparently mundane task of copying a voluminous amount of digital data from one CFAST storage device to another CFAST storage device actually requires a significant amount of advance planning and procurement to insure availability of all necessary hardware followed by a significant amount of time and attention during digital data duplication.

SUMMARY OF THE INVENTION

The present invention relates generally to CFAST storage device used in industry computers and digital camera, and more particularly, relates to the system for making duplication of digital data stored on such CFAST storage device.

A CFAST duplication system is designed for digital data copy between CFAST storage devices. It is built in a chassis with the space that can mount multiple standard 5.25 inch optical disc drives or any other 5.25 inch standard device that has a width of 5.25 inches. The electronic circuit includes a digital logic circuit for reading digital data from one CFAST storage device and writing the read digital data to one or more other CFAST storage devices. A liquid crystal display ("LCD") with 4-key button switches permits an operator to control the CFAST duplicator system.

The CFAST duplication system allows digital data copy from a master CFAST storage device to multiple target CFAST storage devices. The CFAST duplication system includes a duplicator chassis with the space that can install multiple 5.25 inch standard device. A controller is secured in a tray-shaped frame with overall dimensions of one 5.25 inch optical disc drive. An electronic circuit is mechanically secured within the controller, and includes a digital logic circuit for reading digital data from one CFAST storage device and writing the read digital data to other CFAST storage devices. CFAST decks are the means by which CFAST storage devices can be plugged into the CFAST duplicator system.

The duplicator chassis includes a power supply which is located in the rear of chassis to provide power electricity to the CFAST duplicator system, including the controller and CFAST decks. A power switch button is located in the front of duplicator chassis to turn on and turn off the CFAST duplicator system. A fan in the rear of chassis draws internal air flow out of the duplicator chassis in order to cool the CFAST duplication system when it is running. Two opposing sides walls may include means for mechanically securing the controller and CFAST decks within the duplicator chassis.

The controller is physically secured in a tray-shaped frame with opposing side walls that are spanned at one end by a front panel. The tray-shaped frame has overall dimensions of one 5.25 inch optical disc drive, and the side walls respectively include means for mechanically securing the controller within the duplicator chassis. A total of four button switches mounted on the front panel of the controller frame permit operator to control CFAST duplicator system. A display is visible through the front panel of the controller for display indicating operation status of the CFAST duplication system for copying digital data from one CFAST storage device to other CFAST storage devices. The four-button switches are preferably membrane switch buttons.

The display is a liquid crystal display ("LCD") and front panel of the controller frame has an LCD aperture formed there through which the LCD is visible.

The electronic circuit includes a printed circuit board ("PCB") which is mounted on the controller frame, and an electrical-power connector for supplying electrical power to the electronic circuit, storage device connectors for coupling the CFAST storage devices to the electronic circuit. The electronic circuit also includes connectors for input/output information from or to the four-button membrane switches and LCD display. The electronic circuit also includes a digital logic circuit for reading digital data from one CFAST storage device and writing the read digital data to other CFAST storage devices.

The first storage device connector permits coupling to the electronic circuit of the first CFAST deck and CFAST storage device, and additional storage device connectors permit coupling to the electronic circuit of multiple other CFAST decks and CFAST storage devices which conform to the same interface specification. The interface specifications can be the same as the Serial Advanced Technology Attachment ("SATA") specification.

The digital logic circuit further includes a central processing unit ("CPU") that executes computer program for copying digital data from the first CFAST storage device to multiple CFAST storage devices; a read only memory ("ROM") for storing the computer program executed by the CPU; and random access memory ("RAM") for storing digital data read from the first CFAST storage device and supplying such digital data for writing to several other CFAST storage devices.

The CFAST deck is configured to read or write digital data from or to CFAST storage device that is plugged into it, and the CFAST deck is preferably connected to the SATA storage device connector on the controller by SATA cable.

An object of the present invention is to provide a system for efficiently copying voluminous amounts of digital data from one CFAST storage device to another CFAST storage device. Another object of the present invention is to provide a physically compact system for copying voluminous amounts of digital data from one CFAST storage device to another CFAST storage device. Another object of the present invention is to provide a simple system for copying voluminous amounts of digital data from one CFAST storage device to another CFAST storage device. Another object of the present invention is to provide a flexible system for copying voluminous amounts of digital data from one CFAST storage device to another CFAST storage device. Another object of the present invention is to provide a facile system for copying voluminous amounts of digital data from one CFAST storage device to another CFAST storage device.

Briefly, the present invention is a CFAST duplication system for copying digital data from one CFAST storage device to multiple other CFAST storage devices that are mounted in a chassis with the space sized to install several standard 5.25 inch optical disc drives. The CFAST duplication system includes a controller secured in a tray-shaped frame with opposing side walls that are spanned at one end by a front panel. The controller frame side walls respectively include means for mechanically securing the controller into the duplicator chassis.

The CFAST duplication system includes an electronic circuit that is mechanically secured within the controller. The electronic circuit includes an electrical-power connector for supplying electrical power to the electronic circuit. The electronic circuit includes multiple storage device connectors. The electronic circuit also includes a digital logic circuit for reading digital data from one CFAST storage device and writing the read digital data to other CFAST storage devices. The electronic circuit also includes a plurality of switches, located adjacent to the front panel of the chassis, which permit operator control of the digital logic circuit for reading data from one CFAST storage device and writing the read data to another CFAST storage device. To connect CFAST storage devices to the CFAST duplicator system, the CFAST duplication system further includes a SATA-to-CFAST adapter, which can transfer the digital data information between CFAST storage device and the digital logical circuit. The CFAST storage device has the interface of seven pin SATA and seventeen pin power connector.

The CFAST duplication system also includes a display, such as a liquid crystal display ("LCD") that is coupled to the electronic circuit. The display, which is visible through the front panel of the chassis, presents a visible status indicating operation of the CFAST duplication system for copying data from one CFAST storage device to another CFAST storage device.

Preferably, the storage device connectors permit coupling CFAST storage devices, which conform to same interface specifications to the electronic circuit. These features, objects and advantages are apparent and will be understood to those of ordinary skill in the art from the following detailed description of the preferred embodiment and the drawings.

The following call out list of elements is a useful guide in referencing the elements of the drawings.
1 CFAST Duplicating System
6 Housing
8 Power Switch Button
9 Two Opposing Side Walls
10 Power Supply
11 Output
12 Fan
21 Controller
22 Tray-shaped Chassis Controller Frame
23 Two Opposing Side Walls
24 Front Panel
25 Screws
26 Threaded Apertures
27 Bottom Wall
28 Plastic Plate
30 Electronic Circuit
31 Printed Circuit Board (PCB)
32 Electrical-Power Connector
38 Storage Device Connectors
50 Multiple CFAST Decks
52 Front Panel
53 Side Walls
54 Chassis Frame
62 Random Access Memory (RAM)
66 Bridge Chipset
68 CPU
69 Read Only Memory (ROM)
70 PCB
73 SATA data interface Connector
75 SATA power supply Connector
76 Electronic Circuit
78 Docking Device
79 One Port
86 Input/Output Connector
87 Cable
88 Window
89 Four Operational Buttons
89a First Pushbutton
89b Second Pushbutton
89c Third Pushbutton
89d Fourth Pushbutton
90 LCD

DETAILED DESCRIPTION OF THE PREFERRED EMBODIMENT

Figure 1:
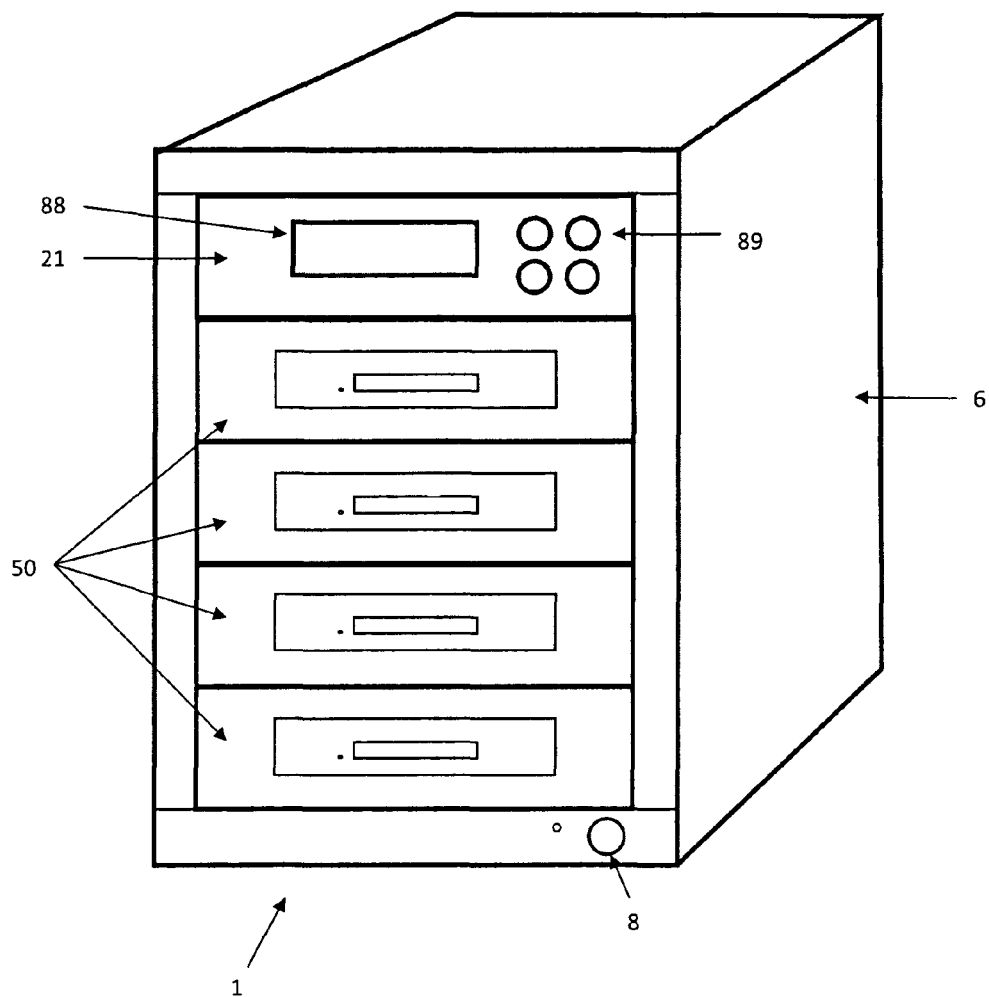
FIG. 1 is a perspective view of a CFAST duplication system in accordance with the present invention.

FIG. 1 depicts a CFAST duplication system in accordance with the present invention referred to by the general reference number 1. The CFAST duplication system 1 includes a housing 6 which has power switch button 8, a controller 21 with four operational buttons 89 and a LCD for status display 88, multiple CFAST decks 50 for plugging in CFAST storage devices.

Figure 2:
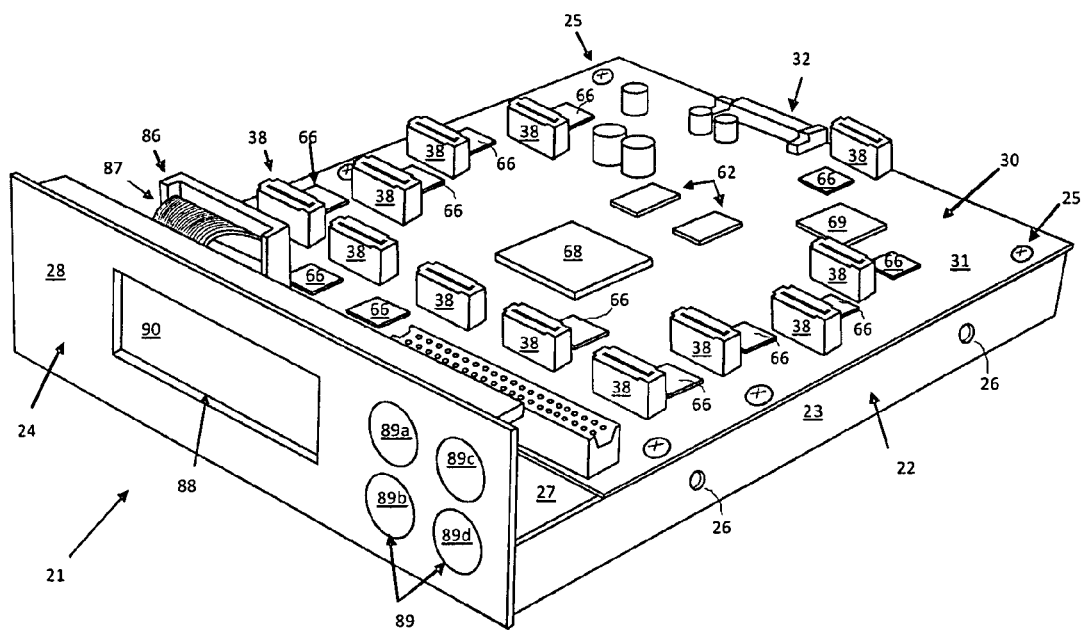
FIG. 2 is a perspective view depicting the controller of CFAST duplication system of FIG. 1 including the PCB and the controller frame.

FIG. 2 depicts the controller 21 of CFAST duplication system 1. Controller 21 includes a tray-shaped chassis frame 22, which has a bottom wall 27, two opposing side walls 23, and a front panel 24. Side walls 23 and front panel 24 project upward from the bottom wall 27. The chassis 21 has overall dimensions, i.e. length, width and height, the same as overall dimensions of a standard size, 5.25 inch, half-height optical disc drive. The side walls 23 respectively include threaded apertures 26 for mechanically securing the controller 21 within the chassis 6.

The controller 21 includes an electronic circuit 30, preferably assembled on a printed circuit board ("PCB") 31. The PCB 31 is mechanically secured within the chassis 22 by screws 25 on a plurality of posts that project upward from the bottom wall 27. The electronic circuit 30 includes an electrical-power connector 32, which is connected to the output 11 of power supply 10 in the duplicator chassis 6 (illustrated in FIG. 4) for supplying electrical power to the electronic circuit 30. The electronic circuit 30 also includes multiple SATA storage device connectors 38. Each of the SATA storage device connectors 38 respectively couples a CFAST deck and CFAST storage device to the electronic circuit 30. The electronic circuit 30 also includes a digital logic circuit illustrated in FIG. 5.

As illustrated in FIG. 2, the front panel 24 consists of a rectangular opening window 88. A liquid crystal display ("LCD") 90 is secured to the front panel 24, adjacent to the window 88 providing two-line characters of display. The front panel 24 of the chassis 22 includes an overlay of plastic plate 28 with four membrane push-buttons 89. This plastic plate 28 has a transparent area with the same size as window 88, which allows LCD 90 to be visible. There is one input/output connector 86 on the electronic circuit 30, which is connected to the LCD 90 and membrane push-buttons by cable 87. This input/output connector is also coupled to the CPU 68, it will pass the instructions from operator who pressing on the push-buttons to the CPU 68, and also output operation status to the LCD 90. Information presented on the LCD 90 is the status of the computer program executed by the CPU 68, it is related to the operation of the CFAST duplication system 1 for copying digital data between CFAST storage devices, and is visible to an operator through the window 88.

An operator of the CFAST duplication system 1 initiates duplication of digital data stored in CFAST storage devices by appropriately pressing the push-button 89. Pressing the first push-button 89a or the second pushbutton 89b, causes the computer program to step through entries in a selection menu which the computer program presents on the LCD 90. When a desired menu entry appears on the LCD 90, the operator presses the third push-button 89c to select that menu entry. Pressing the fourth push-button 89d will exit from current entry back to a higher level entry. After the CFAST duplication system 1 starts digital data duplication, the computer program executed by the CPU 68 will present status information about the copying process on the LCD 90. The CPU is supported by a dedicated bridge chipset 66 to provide parallel processing of copied data to each CFAST deck 50.

The storage-device connectors 38 permit for coupling CFAST deck 50 to the CFAST duplication system 1. Up to twelve (12) CFAST decks, which conform to the SATA specification, can be connected to the SATA storage-device connector 38. The CFAST duplication system 1 may copy digital data present on a CFAST storage device coupled to any of CFAST deck 50, to any or to all other CFAST storage devices coupled to CFAST decks 50 accordingly. Moreover, the CFAST duplication system 1 may record multiple copies of the same digital data concurrently on combinations of up to eleven (11) CFAST storage devices.

To obtain characteristic data for CFAST storage devices, e.g. data storage capacity, which is required for properly reading or writing digital data, the computer program executed by the CPU 68 send request to the CFAST storage devices to gather their characteristics to the computer program. Analogously, the computer program executed by the CPU 68 scans each SATA connector 38 and CFAST deck 50 to determine where and how many CFAST storage devices are concurrently connected to the CFAST duplication system 1. The computer program then uses that information in presenting an operator with a menu that permits selecting the CFAST storage device from which digital data is to be read, and the CFAST storage device(s) to which that digital data will be written.

Figure 3:
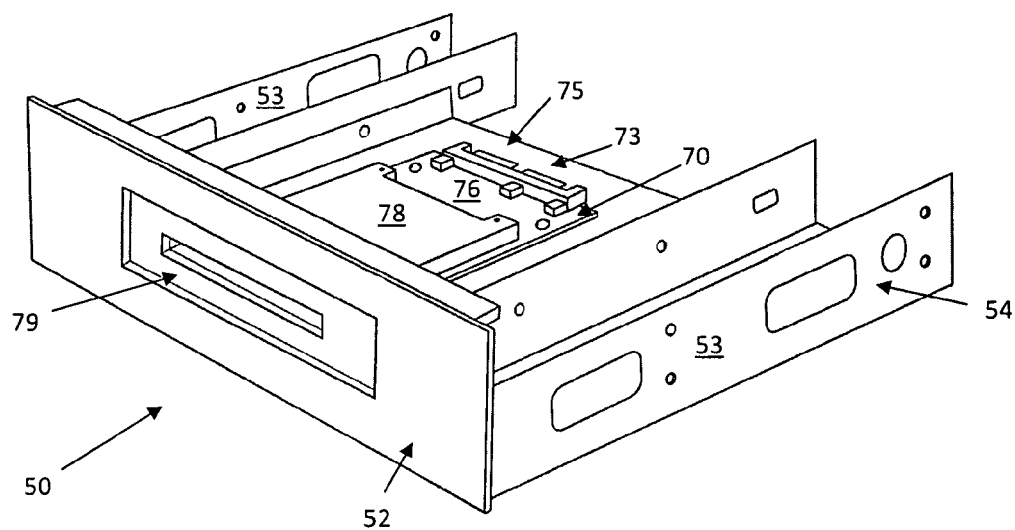
FIG. 3 is a perspective view depicting the CFAST deck of the CFAST duplication system of FIG. 1.

FIG. 3 depicts the CFAST deck 50 of CFAST duplicator system. The CFAST deck includes a tray-shaped chassis 54, which has two opposing side walls 53, and a front panel 52. The chassis 54 has overall dimensions of a standard size 5.25 inch optical disc drive. The side walls 53 respectively include threaded apertures for mechanically securing the CFAST deck 50 within the duplicator chassis 6. The front panel 52 has an opening window slot or port 79 that is good for inserting a CFAST storage device. The CFAST deck 50 also includes an electronic circuit 76, preferably assembled on a printed circuit board ("PCB") 70. The PCB 70 is mechanically secured within the chassis frame 54. The electronic circuit 76 includes an electrical-power connector 75, which is connected to the output connector 11 of power supply 10 in FIG. 4 for supplying electrical power to the electronic circuit 76, and also includes a SATA storage device connector 73. The SATA storage device connector 73 is linked to one of the SATA storage device connectors 38 on the controller 21 by SATA cable. The SATA cable and CFAST storage device are not depicted in any of the Fig.s. The electronic circuit 76 includes a docking device 78 which can host the CFAST storage device. The docking device 78 includes a push-and-push mechanism (push in the CFAST storage device and lock it into the CFAST deck 50, and push it again to release the CFAST storage device from the CFAST deck 50). The CFAST storage device has the data interface of SATA with seven pins, so it can be linked directly to the SATA connector 73, which has also seven pins through the docking device 78. The CFAST storage device has seventeen pins of power connector, different from regular SATA power supply connector 75, which has fifteen pins, only, this has been addressed by the electronic circuit 76.

Figure 4:
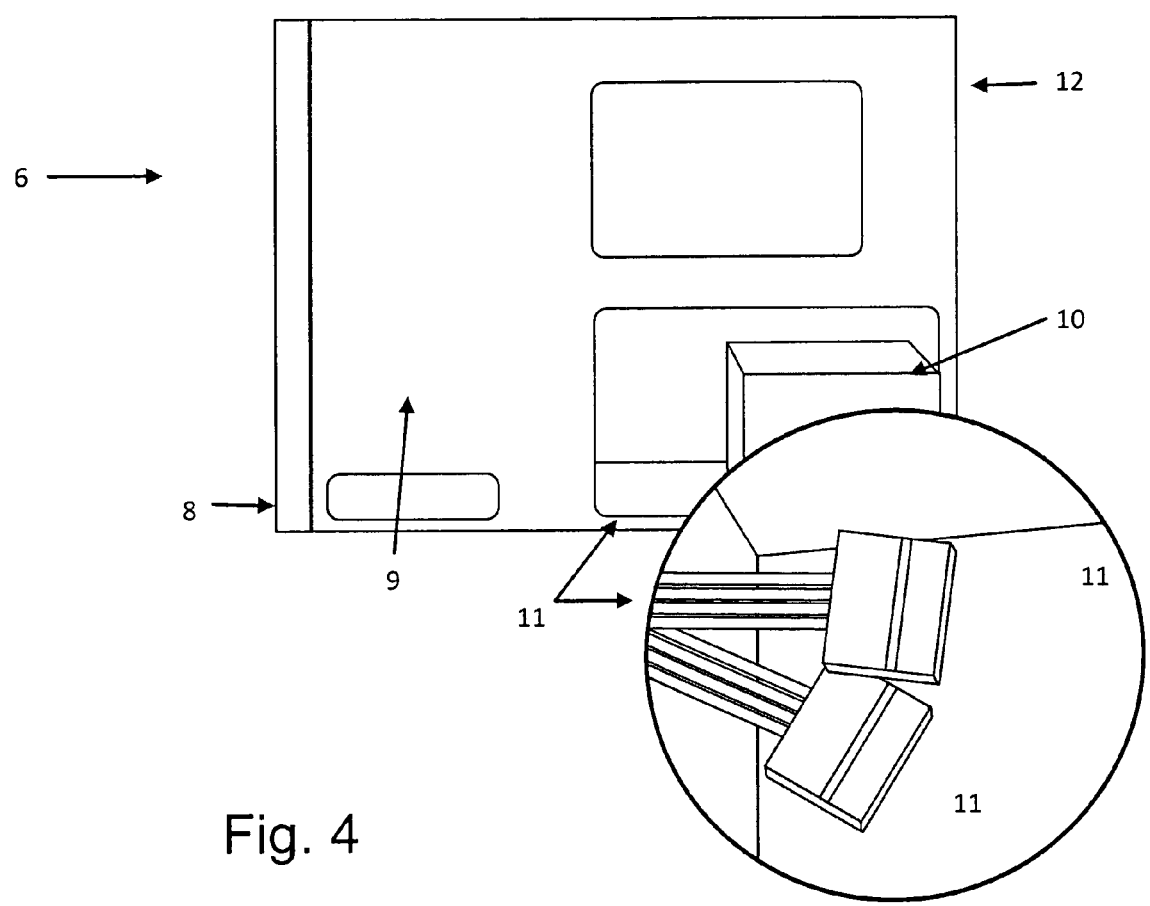
FIG. 4 is a diagram view of the duplicator chassis of the CFAST duplication system illustrated in FIG. 1.

FIG. 4 is a diagram of duplicator chassis 6 of CFAST duplicator system. The duplicator chassis 6 has the space that can install multiple 5.25 inch optical disc drives. It includes a power supply 10 which is located in the rear of chassis 6 to provide electricity to the CFAST duplicator system, including the controller and CFAST decks; a power switch button 8 in the front of duplicator chassis, to turn on and turn off the CFAST duplicator system; a fan 12 in the rear of chassis to suck internal air flow out of duplicator chassis in order to cool down the CFAST duplication system when it is running; two opposing side walls 9 with means for mechanically securing the controller and CFAST decks within the duplicator chassis 6 may include screws, clips or rails. Power supply 10 has multiple outputs 11 with fifteen pins power supply connector for SATA devices.

Figure 5:
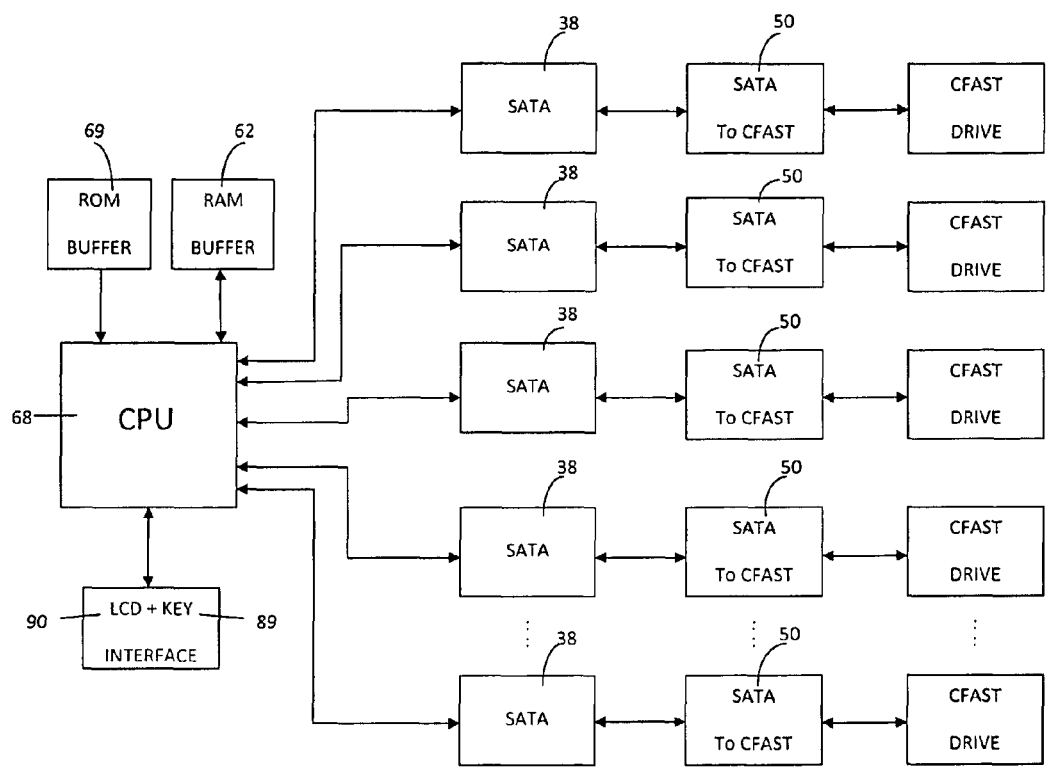
FIG. 5 is a block diagram depicting the digital logical circuit of the CFAST duplication system in FIG. 1.

FIG. 5 depicts the block diagram of digital logical circuit of CFAST duplication system 1. A central processing unit ("CPU") 68 executes a computer program that is stored in a read only memory ("ROM") 69. An operator can give instructions to CPU 68 by pressing on the four button membrane switches 89 on the controller 21. Execution of such instructions by the CPU 68 has effect on copying digital data from one master CFAST storage device to a target CFAST storage device. The physical implementation of the block diagram of FIG. 5 would be on five dedicated bridge chipsets 66, which are preferably identical in circuit design.

The execution status of computer program will be displayed on the LCD 90 of controller 21. In copying digital data from one CFAST storage device to another, a random access memory ("RAM") 62 receives digital data read from one CFAST storage device, and supplies such digital data for writing to the other CFAST storage devices.

Although the present invention has been described in terms of the presently preferred embodiment, it is to be understood that such disclosure is purely illustrative and is not to be interpreted as any limitation. For example, it is readily apparent that the electronic circuit 31 may scale up or down to include less or more than twelve SATA storage-device connectors 38, and the CFAST decks 50. It is also readily apparent from FIGS. 1, 2, 3 and 4, that fewer CFAST decks installed would permit assembling a physically more compact CFAST duplication system 1. Consequently, without departing from the spirit and scope of the invention, various alterations, modifications, and/or alternative applications of the invention will, no doubt, be suggested to those skilled in the art after having read the preceding disclosure. Accordingly, it is intended that the claim should be interpreted as encompassing all alterations, modifications, or alternative applications as fall within the true spirit and scope of the invention.

The invention claimed is:

1. A CFAST duplication system for digital data copy from a master CFAST storage device to multiple target CFAST storage devices, wherein the CFAST duplication system comprises:
   a. a duplicator chassis with slots to receive multiple 5.25 inch device;
   b. a controller secured in a tray-shaped frame with overall dimensions of one 5.25 inch device;
   c. an electronic circuit mechanically secured within the controller, including a digital logic circuit for reading digital data from one CFAST storage device and writing the read digital data to other CFAST storage devices, wherein the electronic circuit further comprises at least five dedicated bridge chipsets, wherein the at least five dedicated bridge sets are operating in parallel;
   d. CFAST decks by which CFAST storage devices being plugged into the CFAST duplicator system, wherein each of the CFAST storage devices are connected to the at least five dedicated bridge chipsets,
wherein the duplicator chassis includes a power supply which is located in the rear of chassis to provide power electricity to the CFAST duplicator system, including the controller and CFAST decks; and further comprising:
   e. a power switch button in the front of duplicator chassis, to turn on and turn off the CFAST duplicator system;
   f. a fan in the rear of chassis to suck internal air flow out of duplicator chassis in order to cool down the CFAST duplication system when said fan is running; and
   g. two opposing sides walls with means for mechanically securing the controller and CFAST decks within the duplicator chassis.

2. The CFAST duplication system of claim 1, wherein the controller is physically secured in a tray-shaped frame with opposing side walls that are spanned at one end by a front panel, the tray-shaped frame having overall dimensions of one 5.25 inch optical disc drive, wherein the side walls respectively include means for mechanically securing the controller within the duplicator chassis, and further comprising:
   a. four-button switches mounted on the front panel of the controller frame which permit operator to control CFAST duplicator system; and
   b. a display which is visible through the front panel of the controller, for display indicating operation status of the CFAST duplication system for copying digital data from one CFAST storage device to other CFAST storage devices.

3. The CFAST duplication system of claim 2, wherein the four-button switches are membrane switch buttons.

4. The CFAST duplication system of claim 2, wherein the display is a liquid crystal display ("LCD") and front panel of the controller frame has an LCD aperture formed there through which the LCD is visible.

5. The CFAST duplication system of claim 1, wherein the electronic circuit includes a printed circuit board ("PCB") which is mounted on the controller frame, an electrical-power connector for supplying electrical power to the electronic circuit, storage device connectors for coupling the CFAST storage devices to the electronic circuit, and connectors for input/output information from or to the four-button membrane switches and LCD display, and wherein the electronic circuit also includes a digital logic circuit for reading digital data from one CFAST storage device and writing the read digital data to other CFAST storage devices.

6. The CFAST duplication system of claim 5, wherein the first storage device connector permits coupling to the electronic circuit of the first CFAST deck and CFAST storage device, and additional storage device connectors permit coupling to the electronic circuit of multiple other CFAST decks and CFAST storage devices which conform to the same interface specification.

7. The CFAST duplication system of claim 6, wherein the interface specifications are the same as the Serial Advanced Technology Attachment ("SATA") specification.

8. The CFAST duplication system of claim 6, wherein the digital logic circuit further includes:
   a. a central processing unit ("CPU") that executes computer program for copying digital data from the first CFAST storage device to multiple CFAST storage devices;
   b. a read only memory ("ROM") for storing the computer program executed by the CPU; and random access memory ("RAM") for storing digital data read from the first CFAST storage device and supplying such digital data for writing to several other CFAST storage devices.

9. The CFAST duplication system of claim 1, wherein the CFAST deck is configured to read or write digital data from or to CFAST storage device that is plugged into it, and wherein the CFAST deck is connected to the SATA storage device connector on the controller by SATA cable.

10. The CFAST duplication system of claim 9, wherein the duplicator chassis includes a power supply which is located in the rear of chassis to provide power electricity to the CFAST duplicator system, including the controller and CFAST decks; and further comprising:
   a. a power switch button in the front of duplicator chassis, to turn on and turn off the CFAST duplicator system;
   b. a fan in the rear of chassis to suck internal air flow out of duplicator chassis in order to cool down the CFAST duplication system when said fan is running; and
   c. two opposing sides walls with means for mechanically securing the controller and CFAST decks within the duplicator chassis.

11. The CFAST duplication system of claim 9, wherein the controller is physically secured in a tray-shaped frame with opposing side walls that are spanned at one end by a front panel, the tray-shaped frame having overall dimensions of one 5.25 inch optical disc drive, wherein the side walls respectively include means for mechanically securing the controller within the duplicator chassis, and further comprising:
   a. four-button switches mounted on the front panel of the controller frame which permit operator to control CFAST duplicator system; and
   b. a display which is visible through the front panel of the controller, for display indicating operation status of the CFAST duplication system for copying digital data from one CFAST storage device to other CFAST storage devices.

12. The CFAST duplication system of claim 9, wherein the four-button switches are membrane switch buttons.

13. The CFAST duplication system of claim 12, wherein the display is a liquid crystal display ("LCD") and front panel of the controller frame has an LCD aperture formed there through which the LCD is visible.

14. The CFAST duplication system of claim 9, wherein the electronic circuit includes a printed circuit board ("PCB") which is mounted on the controller frame, an electrical-power connector for supplying electrical power to the electronic circuit, storage device connectors for coupling the CFAST storage devices to the electronic circuit, and connectors for input/output information from or to the four-button membrane switches and LCD display, and wherein the electronic circuit also includes a digital logic circuit for reading digital data from one CFAST storage device and writing the read digital data to other CFAST storage devices.

15. The CFAST duplication system of claim 14, wherein the first storage device connector permits coupling to the electronic circuit of the first CFAST deck and CFAST storage device, and additional storage device connectors permit coupling to the electronic circuit of multiple other CFAST decks and CFAST storage devices which conform to the same interface specification.

16. The CFAST duplication system of claim 15, wherein the interface specifications are the same as the Serial Advanced Technology Attachment ("SATA") specification.

17. The CFAST duplication system of claim 16, wherein the digital logic circuit further includes:
   a. a central processing unit ("CPU") that executes computer program for copying digital data from the first CFAST storage device to multiple CFAST storage devices;
   b. a read only memory ("ROM") for storing the computer program executed by the CPU; and random access memory ("RAM") for storing digital data read from the first CFAST storage device and supplying such digital data for writing to several other CFAST storage devices.

\* \* \* \* \*